United States Patent [19]
Kozma

[11] Patent Number: 5,983,169
[45] Date of Patent: Nov. 9, 1999

[54] METHOD FOR AUTOMATED TRANSLATION OF CONJUNCTIVE PHRASES IN NATURAL LANGUAGES

[75] Inventor: John P. Kozma, Charleston, S.C.

[73] Assignee: Japan Science and Technology Corporation, Kawaguchi, Japan

[21] Appl. No.: 08/555,931

[22] Filed: Nov. 13, 1995

[51] Int. Cl.$^6$ .................................................. G06F 17/27
[52] U.S. Cl. .................................................. 704/2
[58] Field of Search .................... 395/752, 754, 395/755, 759; 704/2, 4, 5, 9

[56] References Cited

U.S. PATENT DOCUMENTS

| | | |
|---|---|---|
| 5,099,425 | 3/1992 | Kanno et al. . |
| 5,321,607 | 6/1994 | Fukumochi et al. . |
| 5,424,947 | 6/1995 | Nagao et al. . |
| 5,528,491 | 6/1996 | Kuno et al. . |
| 5,625,553 | 4/1997 | Kutsumi et al. . |

Primary Examiner—Robert A. Weinhardt
Attorney, Agent, or Firm—John P. Kozma

[57] ABSTRACT

A system for translating ambiguous expressions from one natural language to another is described. Electronic processing means are used in conjunction with stored grammatical rules to determine multiple parse structures for expressions in the input language and to create corresponding structures for candidate expressions in the output language. In one version of the invention, the possible structures for each candidate output expression are compared with those of the corresponding input expression to determine whether there is an output expression with a set of possible interpretations that matches that of the input expression.

1 Claim, 1 Drawing Sheet

METHOD FOR AUTOMATED TRANSLATION OF CONJUNCTIVE PHRASES IN NATURAL LANGUAGES

BACKGROUND OF THE INVENTION

One of the most ambitious goals of early electronic data processing system designers was to automate the translation of documents from one natural language to another. Although extensive efforts have been invested to this end, and improvements in the speed and storage capacity of electronic data processing equipment have advanced the capability of implemented systems, machine translation has never been entirely successful.

In general, two approaches to machine translation have been taken. Multilingual systems embody an internal representation language into which input documents are first translated. This scheme facilitates translation among several languages, since the design of procedures to translate input from a given language to the internal representation language enables translation into any other language accommodated by the system. Transfer systems, by contrast, comprise procedures to translate directly from a specific input language to a specific output language.

In practice, the versatility of the multilingual system approach is offset by the difficulty of designing procedures to correctly interpret potentially ambiguous input expressions. Early designers envisioned machine translation systems as little more than large electronic dictionaries allowing words in the output language to be automatically looked up at high speed. This capability is still one of the main appeals of machine translation, but only with repeated failures to produce understandable translations was the magnitude of the problem of ambiguity appreciated. Resolving ambiguity in natural language expressions often requires an intricate application of specialized or general semantic knowledge to the expression and its context. As such, multilingual systems require large bodies of facts to be encoded and made accessible to the translation procedures.

One approach to dealing with ambiguity in a multilingual system is illustrated by the KANT system, developed at the Center for Machine Translation, Carnegie Mellon University and described in "Coping with ambiguity in a large-scale machine translation system", K. Baker et al, *Proceedings of the 15th International Conference on Computational Linguistics*, Kyoto, Japan, 1994. The KANT system is designed to translate from English to a number of other languages, and makes use of a preprocessor to detect ambiguity in English input sentences. Although some ambiguous input sentences can be resolved by the preprocessor, others must be rewritten or tagged by the original author to make the intended meaning clear. Thus, the KANT system depends on an interactive exchange with the writer and a sophisticated interface to guide the writer in the resolution of ambiguous input, and as such is not generally applicable to translation of existing documents whose authors are not available to make revisions.

To some extent, the problem of resolving ambiguity may be avoided in transfer type systems. If an input expression admits of several interpretations, but an expression with the same interpretations can be found in the output language, there is no problem. Transfer procedures are typically designed to deal with the syntactic structure of the input and output, and further interpretation is not usually necessary. As such, the quantity of encoded semantic information needed is much less than that in multilingual systems. Even in transfer type systems, however, structural ambiguity remains a problem, and often requires the use of semantic data. The present invention relates to transfer type machine translation systems in particular, but its applications to multilingual systems will be obvious to those skilled in the art.

An example of a transfer type machine translation system is that of the Japan Information Center of Science and Technology (JICST), which has been used since 1990 to translate titles and abstracts of scientific and technical papers from Japanese to English. While providing substantial savings of man-hours as compared with manual translation, the raw output from JICST's system still requires extensive post-editing. A significant source of output errors that must be corrected by such manual post editing is structural ambiguity in the input.

In view of the present problems of machine translation systems, a first goal of the present invention to reduce the amount of semantic information needed in machine translation systems for structural disambiguation.

Yet another goal of the present invention is to reduce the instances of errors in the output of machine translation systems due to structural misinterpretations of input expressions.

A still further goal of the present invention is to reduce the need for manual post-editing of machine translation output.

Still another goal of the present invention is to produce a machine translation system that does not require an interactive exchange to resolve ambiguous input.

BRIEF EXPLANATION OF THE DRAWINGS

A better understanding of the present invention may be gained by referring to the attached drawings, in which.

DETAILED EXPLANATION OF THE INVENTION

Figure 1:
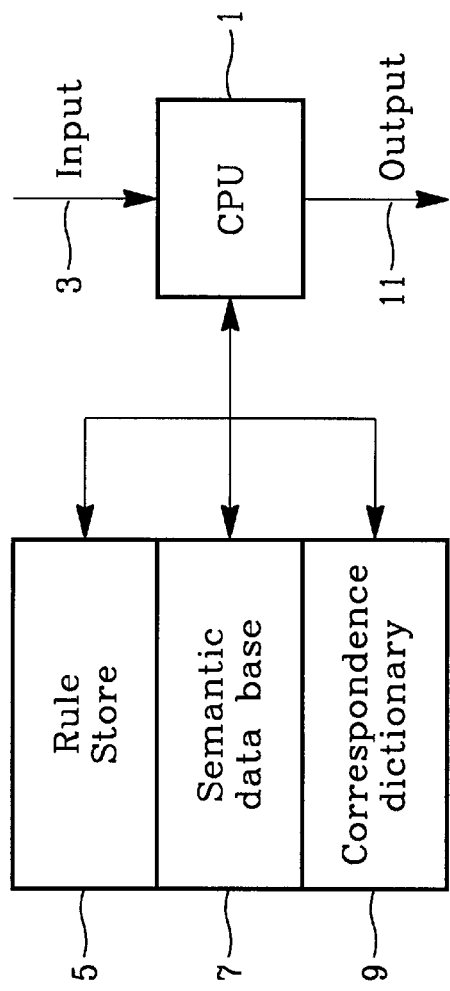
FIG. 1 is a block diagram of a prior art machine translation system.

FIG. 1 shows the general structure of machine translation systems under the prior art. A central processing unit (CPU) 1 receives input 3 expressed in the input language, and accesses grammatical interpretation rules in rule store 5 to determine the correct grammatical structures for expressions in input 3. When an expression in input 3 admits of more than one possible structure, CPU 1 accesses semantic data base (DB) 7 to determine which such structure is most likely to be correct. Upon determining the structure of the input expression, CPU 1 accesses correspondence dictionary 9 to find equivalents in the output language for simple expressions in the input. Rule store 5 is again accessed for further rule procedures to generate grammatically correct output 11 from the equivalent expressions found in correspondence dictionary 9.

The grammatical interpretation, transfer, and generation rules in rule store 5 are derived from grammar models for the input and output languages. Such models usually designate syntactic or structural roles for individual words in the language. Typical syntactic roles that are found in models for most natural languages include noun, verb, and adjective. In general, a grammar model, as manifested by its grammar rules, specifies how words with different syntactic roles are combined to form valid, grammatically correct expressions in the modelled language. Thus, in addition to designated syntactic roles for individual words, a grammar model usually includes designations for one or more types of expressions that can be formed from one or more individual words. Most models include sentences and noun phrases among the designations of valid expressions in the language, and sentences are usually defined in terms of noun phrases and verbs along with other syntactic roles and expressions that vary from one natural language to another.

During the translation process, transferred syntactic structures for the output expressions are generated from the parse structures for the corresponding input expressions in accordance with predetermined transfer rules that specify how the structure of each expression in the input is to be rearranged to form a corresponding expression structure in the output. Accordingly, the transfer rules in rule store 5 are based on the grammatical models of both the input and output languages. Output expressions in turn are generated from the transferred syntactic structures by inverting the parsing process used on the input expressions. Further rules for generation of the output language may be included in the rule store 5 to account for any insertions, deletions, or additional transformations that may be required by the grammatical model for the output language.

A grammar model is said to be ambiguous when it allows an expression to be formed in more than one way, or, put differently, when it permits ambiguous expressions that can have more than one possible structure. An example of such an expression that might be considered ambiguous is the noun phrase (p0) the mother of the boy and the girl.

In terms of traditional English grammar, this phrase is ambiguous because it may be interpreted as either (i1) a prepositional phrase comprising a compound or conjunctive noun phrase, "the boy and the girl", and, in turn, modifying the simple noun phrase "the mother", or (i2) a compound noun phrase comprising a first conjunct, "the mother of the boy," and a second conjunct, "the girl." Such ambiguity in a grammar model is usually designed to correspond to expressions with which different meanings may be associated. The first syntactic structure described for the noun phrase above corresponds to the meaning that involves a reference to one person, a mother with at least two children, a boy and a girl. The second grammatical interpretation corresponds to the semantic interpretation involving a reference to two people, a mother and a girl, wherein the mother has at least one child, a boy. Without further specific information about the mother, the boy and the girl, it is impossible to determine which of the two possible meanings is intended.

In some instances, ambiguity may be resolved by referring to the context of the ambiguous expression. For example, if the expression above were part of the sentence, "The mother of the boy and the girl is here," the second interpretation could be ruled out because the singular form "is" of the copula requires a singular subject. Other cases of ambiguity may require a more elaborate analysis of the context. In the context of "The mother of the boy and the girl came to court. They both testified on his behalf," the neither interpretation can be ruled out on the basis of number agreement, but the second interpretation would be preferred because it provides a more reasonable antecedent for the pronoun "They" in the next sentence. Still other instances of ambiguity may require reference to general or specialized information not available from the input. If a slightly different expression, "the mother of the boy and the orphan," for example, were encountered, the compound noun interpretation would be preferred, based on the knowledge that an orphan is a person whose mother is not living.

Both contextual and external knowledge based disambiguation require some means for storing and accessing appropriate information, represented in FIG. 1 by semantic data base 7. In practice, contextual information may be kept in a temporary memory, separately from other semantic facts. Externally derived information, moreover, may be stored together with the expressions in the correspondence dictionary to facilitate access. Whatever means are used to store and access the information needed for syntactic disambiguation, the procedures which make use of this information must be highly sophisticated to achieve a reasonable level of accuracy. Even with access to massive semantic fact data bases, however, the most advanced disambiguation procedures cannot be completely accurate, because some natural language expressions are interpreted differently by different people and their use may even be intentionally ambiguous.

Figure 2:
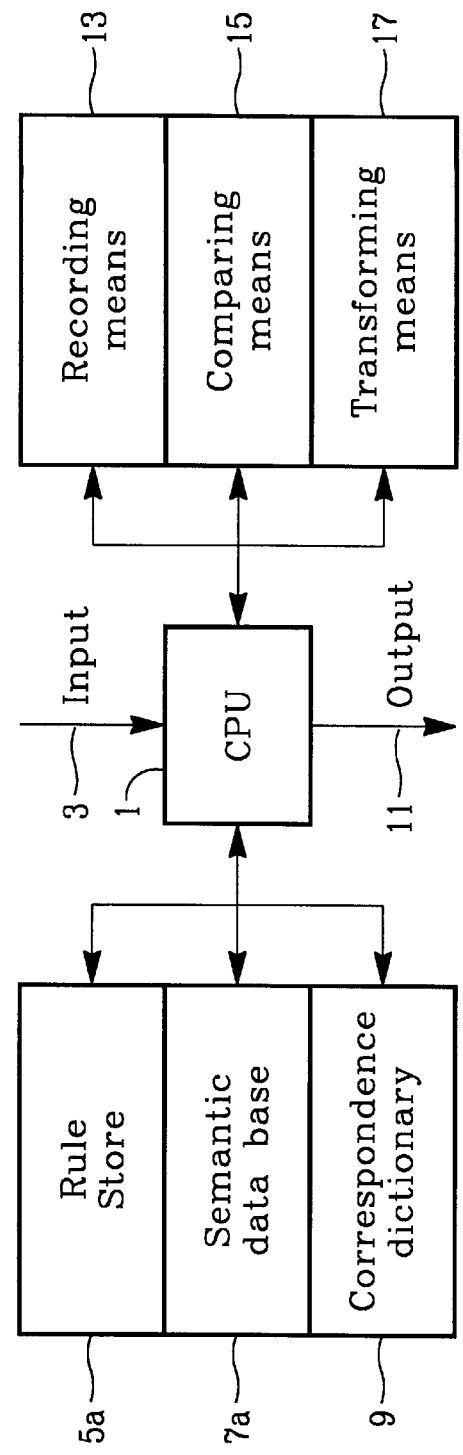
FIG. 2 is a block diagram of a machine translation system in accordance with the present invention.

Referring to FIG. 2, showing a block diagram of a machine translation system in accordance with the present invention, CPU 1, input 3, and correspondence dictionary 9 are essentially the same as in the prior art. Rule store 5a and semantic DB 7a may be similar in structure, but need not have as large a capacity as the corresponding elements in FIG. 1, since much of the procedural and semantic data used for structural disambiguation in the prior art is not needed in the practice of the present invention. It may nevertheless be desirable to retain such information for purposes of additional analysis that will be obvious to system designers and others skilled in the art, for example in instances where the techniques of the present invention are not applicable.

As described above, CPU 1 and rule store 5a together comprise means generating the multiple parse structures in accordance with predetermined input grammar rules manifesting a grammatical model for the input expressions. In accordance with the present invention, the system in FIG. 2 further includes means 13 for recording multiple parse structures for single expressions from input 3 and for further recording structures of output expression candidates generated from such syntactic structures, means 15 for comparing the possible syntactic structures of expressions in input 3 to those of corresponding output expression candidates, and means 17 for transforming the structures recorded by means 13 into alternative structures with like meaning. Taking English as the input language, the general pattern of the example expression (p0) may be represented as (e0) A of B and C where A, B and C represent simple noun phrases. The syntactic structures of expressions with this general form, determined in accordance with traditional English grammar rules as described above, may be recorded, for example, as (s1) A of (B and C) and (s2) (A of B) and C by recording means 13. Structure representations (s1) and (s2) correspond, respectively, to interpretations (i1) and (i2) of phrase (p0) as described above. Those skilled in the art will appreciate that numerous alternatives besides parenthesis (e.g. parse trees, labeled brackets, and derivation tables) may be used for recording the structure of these and more complex expressions.

The output expression candidates corresponding to input expression (e0) will, of course, depend on the designated output language. If the output language is Japanese, and Japanese expressions $A_j$, $B_j$ and $C_j$ are equivalents for A, B and C respectively (as determined, for example, with reference to correspondence dictionary 9), straightforward translation based on the structural representations (s1) and (s2) above would yield Japanese output expression candidates (j1) $B_j$ to $C_j$ no $A_j$ and (j2) $B_j$ no $A_j$ to $C_j$ respectively. The possible syntactic structures of candidate output expression (j1) are (sj1.1) ($B_j$ to $C_j$) no $A_j$ and (sj1.2) $B_j$ to ($C_j$ no $A_j$)

and for the second output candidate, (j2)

(sj2.1) ($B_j$ no $A_j$) to $C_j$ and (sj2.2) $B_j$ no ($A_j$ to $C_j$)

represent the possible structures. These structures may be recorded by recording means 13 along with input expression structures (s1) and (s2).

In accordance with the present invention, the possible interpretations or structures for each input expression are compared with those of each output expression candidate by comparing means 15, to determine whether a candidate exists whose interpretations match those of the input expression. Comparing the possible syntactic structures (s1) and (s2) of input expression (e0) with the possible syntactic structures (sj1.1), (sj1.2), (sj2.1) and (sj2.2) of the corresponding output expression candidates (j1) and (j2), it is seen that structures (sj1.2) and (sj2.2) do not correspond to any of the possible interpretations of the original expression "A of B and C" because each groups "A" with "C". Accordingly, transforming means 17 are used to transform syntactic structures (s1) and (s2) of input expression (e0) into alternative structures with like meaning. These transformed input expression structures are then translated to produce further output expression candidates whose possible structures, in turn, are examined by comparing means 15. Generation of candidate output expressions from the alternative structures uses the same translation rules applied to the initial input expression structures.

If it is assumed that changing the order of conjuncts in a conjunctive noun phrase does not change its meaning, transforming means 17 would be designed to generate expression structures (st1) A of (C and B) and (st2) C and (A of B)

from input expression structures (s1) and (s2) respectively. Translation of either of these transformed structures produces the new candidate output expression (jt1) $C_j$ to $B_j$ no $A_j$ whose possible syntactic structures are (jt1.1) ($C_j$ to $B_j$) no $A_j$ and (jt1.2) $C_j$ to ($B_j$ no $A_j$).

When structures (jt1.1) and (jt1.2) are compared by comparing means 15 with (s1) and (s2), the order of conjuncts is ignored, since it is assumed that such order has no effect on meaning. In general, comparisons by means 15 should disregard any semantically neutral differences that could be viewed as arising from transformations of the type applied by transforming means 17. As such, it is seen that (jt1.1) represents the same meaning as (s1), and (jt1.2) represents the same meaning as (s2). Thus, even though both input expression (e0) and output candidate (jt1) are ambiguous, the same set of interpretations is associated with each. Put another way, expression (jt1) preserves the recognized ambiguity of the corresponding input expression (e0). The system of the present invention, then, will select (jt1) as the preferred translation for (e0), without the need of any semantic analysis.

Those skilled in the art will appreciate that by storing multiple syntactic structures, the present invention may be adapted for multilingual systems. One such adaptation would be to simply store representations for multiple interpretations in terms of the internal representation language. Alternatively, the multiple structures, however recorded, may themselves take the place of the intermediate language. That is, rather than designing an independent intermediate language, structural representations from one of the input languages are combined to provide the expressive capacity needed for internal representations.

It will also be obvious to those skilled in the art that the term "structures", as used here to refer to grammatical interpretations, may actually be as simple as an association between a word or lexeme and its syntactic role or part of speech. Thus, the present method can readily be used to deal with word sense ambiguity by treating the association between a word (lexeme) in the input or output and its designated meaning (word sense) as a structural interpretation. In accordance with the present method, then, individual output words would be selected on the basis of all possible meanings of corresponding words in the input, rather than on the basis of some determination of the likliest intended meaning of the input word.

It should be noted that the transformed output expressions generated by the present invention may not correspond to those that would be given by a human translator. Moreover, not all instances of ambiguity can be expeditiously handled by the present invention. Applicability will depend on patterns of usage in both the input and output languages. Nevertheless, the proposed technique may be used to guide the selection of candidate output expressions in appropriate instances, leaving existing disambiguation techniques to deal with other situations. It may be also possible to combine the transformation technique of the present invention with semantic analysis to reduce the possibility and effect of misinterpretation even in situations where it cannot be eliminated completely.

The general procedure of the present invention as described above is to compare the possible structures of each input expression with those of its candidate output expressions to determine whether there is a candidate output expression whose possible interpretations match those of the input expression. If the introduction of ambiguity during the machine translation process is permitted, an alternative procedure that does not require comparison of structural representations may be used. In particular, relevant transformations are applied to each possible parse structure, and as the corresponding output expression candidates are generated a record is kept of the parse structures from which each is derived, whereby it may be determined whether there is a single output expression candidate which can be generated from all of the possible parse structures for a given input expression. Although the possible interpretations or structures of such a candidate output expression, if found, may include some interpretations that would not be associated with the input expression, they will necessarily include all of the possible interpretations of the input expression. Since the introduction of ambiguity is deemed permissible, a candidate output expression identified in this manner may be accepted without further processing. In terms of the example expression analysis above, candidate output expression (jt1) satisfies this alternative condition because it may be generated from either of the possible parse structures (s1) or (s2) of the initial input expression (e0). As described, (jt1) is derived from (s1) via transformed structure (st1) and from (s2) via transformed structure (st2). Thus, the possible interpretations of (jt1) are known to subsume those of (e0) without comparing the corresponding structures.

What is claimed is:

1. In a machine translation system including electronic means for storing predetermined input grammar rules manifesting a grammatical model for an input language and predetermined output grammar rules manifesting a grammatical model for an output language and further electronic means for processing expressions in the input language in accordance with the input grammar rules and generating corresponding expressions in the output language in accordance with the output grammar rules, said grammatical models including designations for conjunctions, noun phrases, and phrases that can modify noun phrases, both the input and output languages allowing conjunctive noun phrases to be formed from two or more conjunct noun phrases, wherein the relative order of the conjunct noun phrases may be reversed without changing the meaning of the conjunctive noun phrase in either the input language or the output language, and the both the input and output languages allowing modified noun phrases to be formed from an unmodified noun phrase and a modifying noun phrase, wherein the relative order of the unmodified noun phrase and the modifying noun phrase in the input language is reversed in the output language, said system operating by generating possible parse structures for input expressions in the input language in accordance with the input grammar rules and applying transfer rules to said parse structures to generate transferred parse structures, and generating expressions in the output language from the transferred parse structures, an improved method for translating conjunctive noun phrases, said method comprising:

identifying each input expressions for which more than one possible parse structure is initially generated and (i) one of the possible parse structures for said input expression indicates that said input expression is a conjunctive noun phrase in which one of the conjunct noun phrases comprises a modified noun phrase and a modifying noun phrase and (ii) another one of the possible parse structures indicates that said input expression is a modified noun phrase comprising an unmodified noun phrase and a modifying noun phrase in which either the unmodified noun phrase or the modifying noun phrase is a conjunctive noun phrase;

transforming the input expression parse structures for the identified input expressions into alternate structures with like meaning by reversing the order of the conjuncts; and generating output expressions from the alternate structures instead of from the initially generated parse structures;

whereby said output expressions preserve the ambiguity in the corresponding input expressions manifested by the multiple initially generated parse structures.

* * * * *